United States Patent [19]
Hongo et al.

[11] Patent Number: 5,100,071
[45] Date of Patent: Mar. 31, 1992

[54] MOTOR ARMATURE COIL WINDING MACHINE

[75] Inventors: Nobuhisa Hongo, Gumma; Kenji Kanai, Tochigi; Takayuki Maezawa, Gumma, all of Japan

[73] Assignee: Mitsuba Electric Mfg. Co., Ltd., Kirya, Japan

[21] Appl. No.: 498,283

[22] Filed: Mar. 23, 1990

[30] Foreign Application Priority Data

Mar. 23, 1989 [JP] Japan .................................. 1-71368

[51] Int. Cl.$^5$ ............................................. H02K 15/04
[52] U.S. Cl. .................................. 242/7.05 B; 29/598
[58] Field of Search ................................ 29/598, 605; 242/7.05 B, 7.05 C

[56] References Cited

U.S. PATENT DOCUMENTS

| | | | |
|---|---|---|---|
| 3,980,243 | 9/1976 | Schulman | 242/7.05 B |
| 4,289,281 | 9/1981 | George et al. | 242/7.05 B |
| 4,974,313 | 12/1990 | Reiger, Jr. | 29/598 X |

Primary Examiner—Daniel P. Stodola
Assistant Examiner—William G. Battista, Jr.
Attorney, Agent, or Firm—Marshall & Melhorn

[57] ABSTRACT

A motor armature core coil winding machine comprising a rotating spindle carrying a flier arm at its free end by way of a flier mounting block, a wire guide block rotatably and coaxially supported by the flier mounting block by way of a stub shaft fixedly secured to the wire guide block, an intermediate shaft rotatably supported by the flier arm mounting block in parallel with the spindle, a first endless belt passed around a first pulley fixedly secured to a fixed member coaxially with the spindle and a second pulley fixedly secured to an end of the intermediate shaft, and a second endless belt passed around a third pulley fixedly secured to the other end of the intermediate shaft and a fourth pulley fixedly and coaxially secured to a stub shaft of the wire guide block. Thus, even though the wire guide block is mounted on a free end portion of a spindle which rotates integrally with a flier, the wire block is kept stationary, and can maintain a spaced and fixed relationship with the armature core. Therefore, the armature core may be indexed without moving the wire guide block away from the armature core, and impulsive contact between the wire guide block and the armature core may be avoided.

2 Claims, 2 Drawing Sheets

MOTOR ARMATURE COIL WINDING MACHINE

TECHNICAL FIELD

The present invention relates to an improved motor armature coil winding machine.

BACKGROUND OF THE INVENTION

FIG. 3 shows a conventional motor armature coil winding machine 1'. According to this coil winding machine 1', an end of a shaft carrying a rotor core 2 is supported by a collet chuck (now shown in the drawing) so that coils may be wound around core teeth defined in the rotor core 2 as the rotor core 2 is indexed or the angular position of the rotor core 2 is changed by way of the collet chuck. Wire 5 is supplied from a hole 4 extending centrally and axially through a spindle 3 which can rotate around an axial line passing through the axial line of the rotor core 2 perpendicularly thereto. A flier arm 6 is securely attached to a free end portion of the spindle 3, and the wire 5 is guided along the flier arm 6 to its free end. The wire 5 further extends from the free end of the flier arm 6 to the rotor core 2 via a wire guide bock 7 so that coils of wire may be passed into core slots 8 and wound around appropriate core teeth of the rotor core 2 as the spindle 3 is turned.

The wire guide block 7 is rotatably and coaxially supported by a free end portion of the spindle 3 by way of a stub shaft 9 integral with the wire guide block 7 and a pair of ball bearings 10a received in a cavity formed in a free end of the spindle 3 so that it may keep its stationary position in spite of the rotation of the spindle 3. Normally, there is a small gap between the wire guide block 7 and the rotor core 2 so as to allow the rotor core 2 to be indexed. A typical example of such a motor armature coil winding machine is disclosed in U.S. Pat. No. 3,506,864.

But, because of friction between the wire guide block 7 and the spindle 3, the wire guide block 7 is frequently brought into impulsive contact with the outer circumferential surface of the rotor core 2, and this causes wear to the wire guide block 7. Undue wear of the wire guide block 7 will eventually make it inadequate for proper wire guiding operation, It is possible to push the wire guide block 7 against the rotor core 2 to prevent any impulsive contact therebetween, but the wire guide block 7 must be moved away from the rotor core 2 whenever the rotor core is to be indexed, and this increases the time required for winding coils for each armature core.

BRIEF SUMMARY OF THE INVENTION

In view of such a problem of the prior art, a primary object of the present invention is to provide an armature coil winding machine in which the wire guide block is kept away from contacting the rotor core to reduce the time required for indexing the rotor core without involving any impulsive contact between the wire guide block and the rotor core.

A second object of the present invention is to provide an armature coil winding machine which is efficient and durable.

These and other objects of the present invention can be accomplished by providing a coil winding machine for motor armature cores, comprising: a spindle which is rotatively driven in relation with a machine frame; a flier arm mounting block integrally attached to a free end of the spindle and carrying a flier arm; a wire guide block rotatably supported by the flier arm mounting block at its free end coaxially with the spindle; and power transmission means for turning the wire guide bock relative to the spindle at a same speed as the spindle is turned relative to a fixed member but in opposite direction.

The power transmission means may consist of an intermediate shaft rotatably mounted on the flier arm mounting block in parallel with the spindle; a first pulley fixedly mounted on the machine frame coaxially with the spindle; second and third pulleys having an identical diameter integrally mounted on either axial end of the intermediate shaft; a fourth pulley having an identical diameter to that of the fixed first pulley and mounted integrally on the wire guide block coaxially with the first pulley; a first endless belt passed around the first pulley and the second pulley; and a second endless belt passed around the third pulley and the fourth pulley.

Thus, even though the wire guide block is mounted on a free end portion of a spindle which rotates integrally with a flier, the wire block is kept stationary, and can maintain a spaced and fixed relationship with the armature core. Therefore, the armature core may be indexed without moving the wire guide block away from the armature core so that the efficiency of the process of winding armature coils can be improved, and impulsive contact between the wire guide block and the armature core may be avoided so that the durability of the wire guide block may be improved.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
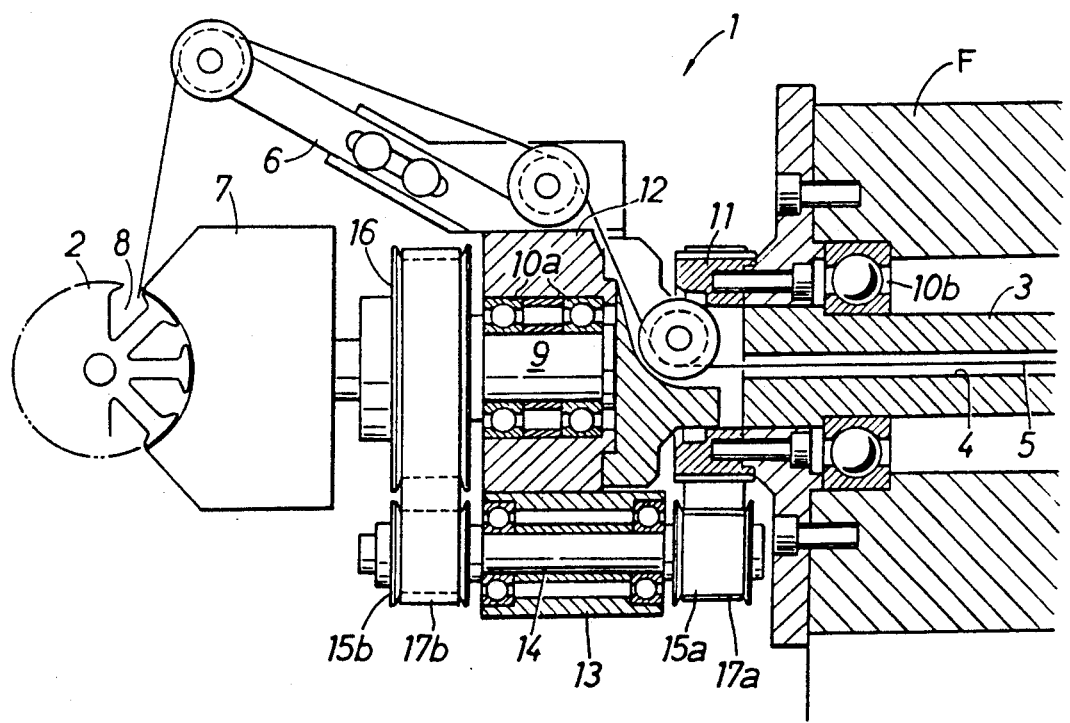
FIG. 1 is a sectional view of a preferred embodiment of the armature coil winding machine according to the present invention.

Referring to FIG. 1 showing an armature coil winding machine 1 according to the present invention, an end of a shaft carrying a rotor core 2 is supported by a collet chuck (not shown in the drawings) so that the rotor core 2 may be angularly indexed by way of the collet chuck while coils are wound around core teeth defined in the rotor core 2. Wire 5 is supplied from an axial hole 4 extending centrally through a spindle 3 which is supported by a fixed machine frame F by way of a ball bearing 10b and can rotate around an axial line perpendicularly passing through the central axial line of the rotor core 2. A flier arm 6 is securely attached to a flier arm mounting block 12 which is securely attached to a free end portion of the spindle 3, and the wire 5 is guided along the flier arm 6 to its free end. The wire 5 further extends from the free end of the flier arm 6 to the rotor core 2 via a wire guide block 7 so that the wire may be passed into the core slots 8 and coils of wire may be wound around appropriate core teeth of the rotor core 2 as the spindle 3 is turned.

The wire guide block 7 is rotatably and coaxially supported by a free end portion of the flier mounting block 12 by way of a stub shaft 9 integrally attached to the wire guide block 7 and a pair of ball bearings 10a. A pulley 11 is fixedly secured to the machine frame F coaxially with the spindle 3. A support arm 13 is securely attached to the flier arm mounting block 12 diagonally opposite to the flier arm 6, and rotatably supports a rotary shaft 14 in parallel with the axial line of the spindle 3. A pair of substantially identical pulleys 15a and 15b are fixedly attached to either end of the rotary shaft 14. The stub shaft 9 integrally carries a pulley 16 between its free end carrying the wire guide block 7 and its base end rotatably supported by the ball bearings 10a. An endless belt 17b is passed around the pulley 16 and the pulley 15b, and another endless belt 17a is passed around the pulley 11 and the pulley 15a. The pulleys 16 and 11 are coaxial with each other, and have an identical diameter. The pulleys 15a and 15b likewise have an identical diameter. The endless belts 17a and 17b consist of cogged belts and the pulleys 11, 15a, 15b and 16 are provided with corresponding teeth on their outer circumferences so that there is substantially no slipping between the belts and the pulleys.

Figure 2:
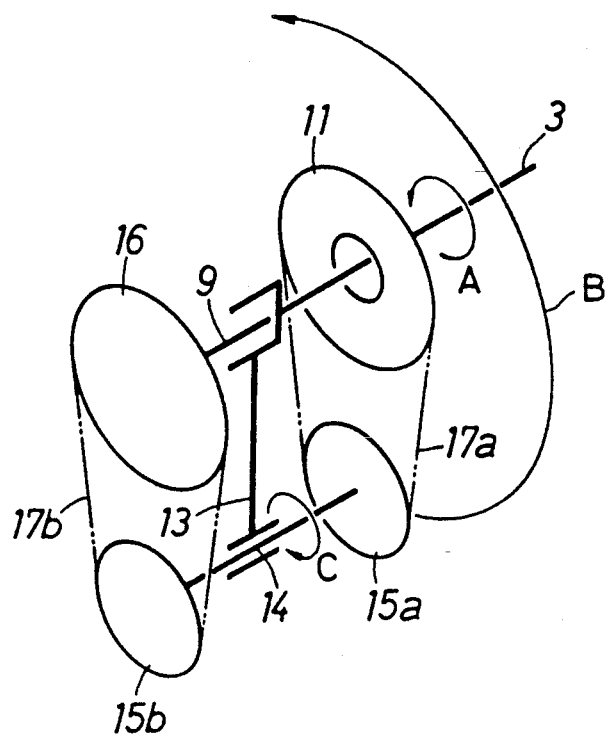
FIG. 2 is a skeleton diagram showing the operation of the armature coil winding machine.
Figure 3:
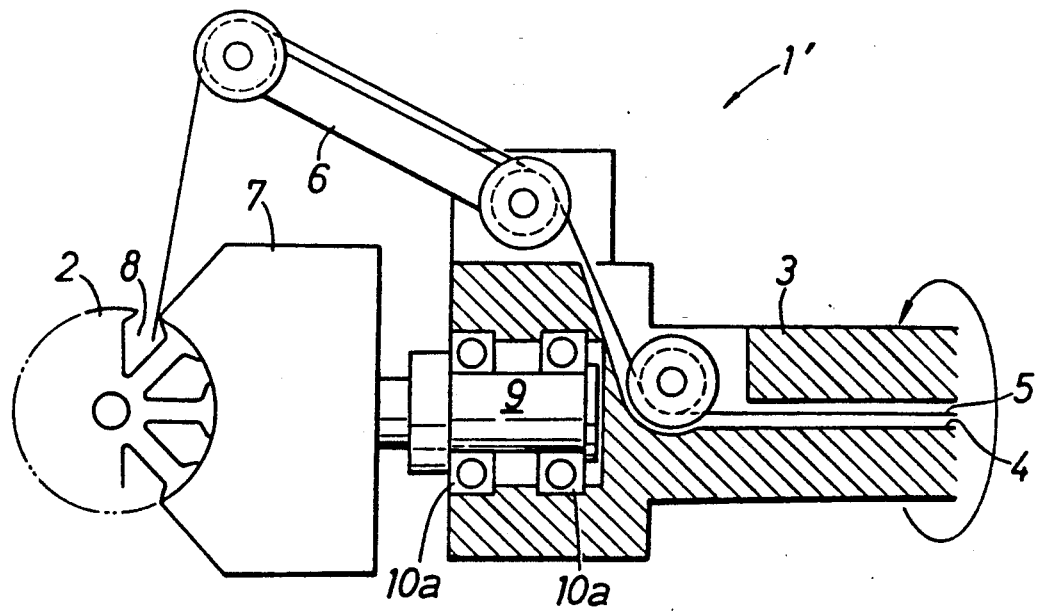
FIG. 3 is a view similar to FIG. 1 showing a conventional armature coil winding machine.

Now the mode of operation of this motor armature coil winding machine is described in the following with reference to FIG. 2.

As the spindle 3 is turned, the wire 5 fed out from the flier 6 is passed around a core tooth of the rotor core 2. Suppose that the spindle 3 has made a single turn, for instance, counter clockwise as seen from the wire guide block 7 as indicated by the arrow A. Then, the intermediate shaft 14 makes a single turn around the pulley 11 counter clockwise as indicated by the arrow B, and, at the same time, turns around itself n times as indicated by the arrow C where n is the ratio of the diameter of the pulley 11 to the diameter of the pulley 15a.

The rotation of the intermediate shaft 14 around the fixed pulley 11 would rotate the pulley 16 in counter clockwise direction if the intermediate shaft 14 were fixedly secured to the support arm 13. However, since the intermediate shaft 14 rotates n times around itself in clockwise direction as it makes a full turn around the fixed pulley 11 in counter clockwise direction, the pulley 16 remains stationary as seen from a fixed frame of reference.

Thus, according to the present invention, even though the wire guide block 7 is mounted on a free end portion of the spindle 3 which rotates integrally with the flier 6, the wire guide block 7 is kept stationary, and can maintain a spaced and fixed relationship with the armature core 2. Therefore, the armature core may be indexed without moving the wire guide block away from the armature core so that the efficiency of the process of winding armature coils can be improved, and impulsive contact between the wire guide block and the armature core may be avoided so that the durability of the wire guide block may be improved.

Although the present invention has been described in terms of a specific embodiment, a person skilled in the art can modify various parts thereof without departing from the spirit of the invention.

What is claimed is:

1. A coil winding machine for motor armature cores, comprising:
    a spindle which is rotatively driven in relation with a machine frame;
    a flier arm mounting block integrally attached to a free end of said spindle and carrying a flier arm;
    an intermediate shaft rotatably mounted on said flier arm mounting block in parallel with said spindle;
    a wire guide block rotatably supported by said flier arm mounting block at its free end coaxially with said spindle;
    a first pulley fixedly mounted on said machine frame coaxially with said spindle;
    second and third pulleys having an identical diameter integrally mounted on either axial end of said intermediate shaft;
    a fourth pulley having an identical diameter to that of said first pulley and mounted integrally on said wire guide block coaxially with said first pulley;
    a first endless belt passed around said first pulley and said second pulley; and
    a second endless belt passed around said third pulley and said fourth pulley.

2. A coil winding machine for motor armature cores, comprising:
    a spindle rotatably supported by a fixed machine frame and carrying a flier arm mounting block at its free end;
    first power means for rotating said spindle relative to said fixed machine frame;
    a wire guide block rotatably supported by said flier arm mounting block coaxially with said spindle; and
    second power means for turning said wire guide block relative to said spindle at a same speed as said spindle is turned relative to said fixed machine frame but in the opposite direction,
    whereby said wire guide block is kept stationary with respect to said fixed machine frame.

* * * * *